(No Model.)
G. RANK.
HARNESS SADDLE.
No. 351,282. Patented Oct. 19, 1886.
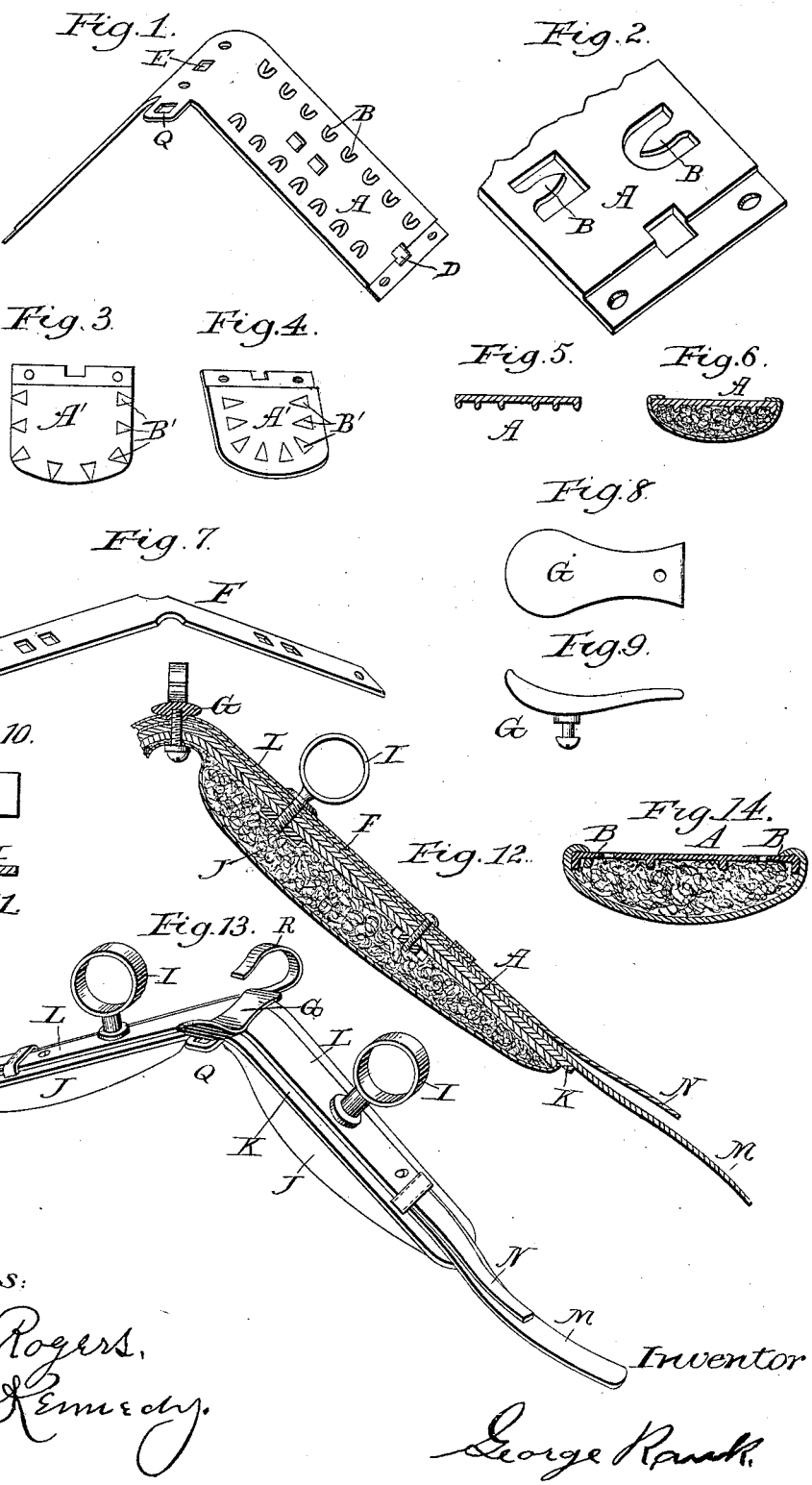
Witnesses:
H. H. Rogers.
A. H. Kennedy.
Inventor
George Rank.

UNITED STATES PATENT OFFICE.

GEORGE RANK, OF SALEM, OHIO.

HARNESS-SADDLE.

SPECIFICATION forming part of Letters Patent No. 351,282, dated October 19, 1886.

Application filed July 21, 1886. Serial No. 208,678. (No model.)

*To all whom it may concern:*

Be it known that I, GEORGE RANK, a citizen of the United States, residing at Salem, in the county of Columbiana and State of Ohio, have invented certain new and useful Improvements in Harness-Saddles, and the following is a full, clear, and exact description of the invention, such as will enable others skilled in the art to which it appertains to make and use the same.

My invention relates to improvements in harness or so-called "gig saddles," coach-pads, and the like, the first object of which is to provide a metal tree having formed on or attached to its outer edge or edges a series of inwardly-projecting spurs or teeth, by means of which the leather of the pad or other covering may be easily and securely fastened to the tree.

The second object is to provide a sheet-metal extension-piece on the lower end of each leg of the cast-metal tree and working in combination therewith.

The third object is to provide a sheet-metal stiffener for the jockey, and working in combination therewith.

In the accompanying drawings, Figure 1 is a view in perspective of my improved metal tree. Fig. 2 is a view in perspective of the lower end of one leg of the tree, enlarged; Figs. 3 and 4 are views of my improved sheet metal extension-piece. Fig. 5 is a transverse section of the tree. Fig. 6 is a transverse section of the tree and pad. Fig. 7 is a view of my improved jockey-stiffener. Figs. 8 and 9 are views of the saddle-seat. Figs. 10 and 11 are views of the elongated terret-nuts. Fig. 12 is an elevation in longitudinal section of one part of my improved harness-saddle. Fig. 13 is a view in perspective of my improved harness-saddle completed. Fig. 14 is a sectional view showing how the leather is hooked onto the inwardly-projecting spurs.

A represents the tree; A', the extension-piece; J, the pad; K, the housing; L, the jockey; M, the skirt; G, the seat; I, the terrets; N, the thill-straps, &c.

My tree is preferably made of malleable cast-iron, and has a series of square, semicircular, or crescent-shaped holes along the edges, and inside of each one of these holes is an inwardly-projecting spur or tooth, B, as shown in Figs. 1 and 2. On the under side of the tree are a number of beads or strengthening-ribs, as is shown in Fig. 5, the two in the middle forming a channel, inside of which the terret and other fastening nuts are held and kept from turning. To the lower end of each leg of the tree a sheet-metal extension-piece, such as is shown in Figs. 3 and 4. These extension-pieces have cut or formed on their lower ends and sides a series of saw-like teeth, B', projecting upward or inward. These extension-pieces may be bent, if desired, so that the pad can be made to conform somewhat to the shape of the horse. Being riveted to the tree, a series of spurs or teeth are provided around the entire edge of the tree, by means of which the leather of the pad can be easily and quickly fastened to the tree, saving considerable labor over the usual manner of stitching the same on with needle and thread. After the leather or other casing for the pad has been hooked onto the spurs and teeth of the tree and its extension-piece, as described, the hair or other filling is inserted at one end and the pad is finished and securely fastened to the tree.

Two square holes are formed in each leg of the tree at the usual place for the terrets, one or more holes for the seat in the center of the tree, and one at the lower end of each leg of the tree for the pad screw or bolt, as shown in Figs. 1 and 2.

The housing for my improved harness-saddle is made in the usual manner, and need not be particularly described. The saddle-seat, the terrets, the rein or water-hook, the skirt, thill-straps, &c., are also made in the usual manner, and need not be particularly described.

The jockey L for my improved harness-saddle is made of two separate pieces of leather—a main piece and its lining—between which is inserted a piece of sheet metal properly provided with holes for the terret-shanks and pad-screws. This piece of sheet metal is called the "jockey-stiffener," F. (See Fig. 7.) It is placed between the main portion of the jockey and its lining, as above stated, which are then stitched together on a machine.

The nuts for the terret-shanks and pad-screws are made of proper width, so that they can easily be inserted through the square holes in the tree; but by preference they are made several inches long, so that one end can be inserted and pushed in under the tree until the other end drops into the hole, and can be pressed down under the tree and drawn back to its proper position to receive its bolt or screw.

All the several parts of my improved harness-saddles being constructed in the manner shown and described, they are easily and quickly put together, which is done as follows: The pads being formed and fastened to the tree in the manner described, the housing is first laid on top of the tree, and then the jockey, skirts, and thill-straps, being stitched together, are laid on the top of the housing, the seat is fastened down in its place, and the terrets and pad-screws are inserted as shown, and the whole harness-saddle is completed.

This harness-saddle may as readily be taken apart as put together, and it is simple and strong. The method of fastening the pads to the tree by means of the spurs or teeth on the tree and its extension-piece is a valuable improvement, as it will be almost impossible for the pads to tear loose by ordinary wear, and if they should tear loose at any point they can easily be repaired.

Being simple in construction and easily understood, these harness-saddles can be cheaply manufactured and their initial cost very materially reduced by the use of my improvements.

Having fully described my invention, what I desire to secure by Letters Patent is—

1. As a new article of manufacture, a harness-saddle tree having a series of inwardly-projecting spurs or teeth formed on or attached to its outer edge or edges, to be used as a means of fastening the pad or other leather parts to the tree, constructed and operating in the manner substantially as shown and described.

2. In a harness-saddle, the combination, with a cast-metal tree constructed as described, of the sheet-metal extension-pieces on its lower ends, constructed and operating in the manner and for the purpose substantially as shown and described.

3. In a harness-saddle, the combination, with a cast-metal tree constructed as described, and its sheet-metal extension-piece attached thereto, of the pad-leather or pad-casing hooked onto the spurs or teeth of the tree, in the manner substantially as shown and described.

4. In a harness-saddle, the combination, with a cast-metal tree constructed as described, of a jockey having a sheet-metal stiffener inserted between the jockey and its lining before stitching the same together, substantially as shown and described.

5. In a harness-saddle, the combination, with the cast-metal tree A, constructed as described, and the sheet-metal extension-pieces A', constructed as described, of the pads J, housing K, skirt M, jockey L, and thill-straps N, the combination being and operating in the manner substantially as shown and described.

GEORGE RANK.

Witnesses:
WILLIAM H. ROGERS,
A. H. KENNEDY.